United States Patent
Chen et al.

(10) Patent No.: US 10,983,816 B2
(45) Date of Patent: Apr. 20, 2021

(54) SELF-ADAPTIVE BUILDING CONTAINER IMAGES

(71) Applicant: INTERNATIONAL BUSINESS MACHINES CORPORATION, Armonk, NY (US)

(72) Inventors: Peng Fei Chen, Beijing (CN); Tian Cheng Liu, Beijing (CN); Jing Min Xu, Beijing (CN); Bao Hua Yang, Beijing (CN); Lin Y Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 15/729,845

(22) Filed: Oct. 11, 2017

(65) Prior Publication Data
US 2019/0108048 A1    Apr. 11, 2019

(51) Int. Cl.
*G06F 9/44*   (2018.01)
*G06F 9/455*  (2018.01)
*G06F 9/4401* (2018.01)
*G06F 8/36*   (2018.01)
*G06F 8/41*   (2018.01)
*G06F 9/445*  (2018.01)

(52) U.S. Cl.
CPC ............ *G06F 9/45537* (2013.01); *G06F 8/36* (2013.01); *G06F 8/41* (2013.01); *G06F 8/443* (2013.01); *G06F 9/4406* (2013.01); *G06F 9/455* (2013.01); *G06F 9/45558* (2013.01); G06F 9/44505 (2013.01); G06F 2009/45562 (2013.01)

(58) Field of Classification Search
None
See application file for complete search history.

(56) References Cited

U.S. PATENT DOCUMENTS 9,342,273 B1 *  5/2016  Kumar .................... G06F 8/20
9,355,248 B1    5/2016  Wiest et al.
9,569,180 B1    2/2017  Jiang et al.
(Continued)

OTHER PUBLICATIONS

Mattetti et al., "Securing the infrastructure and the workloads of linux containers", 2015 IEEE Conference on Communications and Network Security (CNS), Florence, Italy, Sep. 28-30, 2015, pp. 559-567.
(Continued)

*Primary Examiner* — Fahmida Rahman
(74) *Attorney, Agent, or Firm* — Dmitry Paskalov (57) ABSTRACT

A computing device receives template files and parameters associated with the template files, where the template files comprise scripts, and where the associated parameters comprise a user preference associated with an efficiency of the image. The computing device may determine dependencies between layers of the scripts based on a unified image model. The unified image model may generate a logic tree that includes nodes, where each one of the nodes represents each one of the layers of the scripts. The computing device may generate an efficient logic tree based on the logic tree and the user preference of a generated image model. The generated image model may generates the efficient logic tree by changing the dependencies of the nodes in the logic tree based on the user preference. Based on the generated efficient logic tree the computing device may build the image.

18 Claims, 9 Drawing Sheets

(56) References Cited

U.S. PATENT DOCUMENTS

| | | |
|---|---|---|
| 10,078,577 B2 | 9/2018 | Thomas et al. |
| 10,572,226 B2 | 2/2020 | Biskup et al. |
| 2004/0268298 A1* | 12/2004 | Miller .................. G06F 8/60 |
| | | 717/106 |
| 2016/0350081 A1 | 12/2016 | Kumar et al. |
| 2017/0068676 A1* | 3/2017 | Jayachandran ....... G06F 16/125 |
| 2018/0025160 A1* | 1/2018 | Hwang ................. G06F 21/577 |
| | | 726/25 |
| 2018/0060744 A1* | 3/2018 | Achin ................... G06F 9/5011 |
| 2018/0088926 A1 | 3/2018 | Abrams |

OTHER PUBLICATIONS

Authors et al., Disclosed Anonymously, "System and Method for Cloud Virtual Appliance Image Deployment Restriction", An IP.com Prior Art Database Technical Disclosure, IP.com Electronic Publication Date: May 27, 2014, pp. 1-4.

IBM, "Bluemix", https://console.bluemix.net/, Accessed on Sep. 27, 2017, 1 page.

IBM, "Docker", https://www.docker.com/IBM, Accessed on Sep. 27, 2017, pp. 1-8.

Mell et al., "The NIST Definition of Cloud Computing," U.S. Department of Commerce, National Institute of Standards and Technology, Sep. 2011, p. 1-7, Special Publication 800-145.

\* cited by examiner

1  FROM ubuntu:14.04
7  MAINTAINER Docker User
242 2  RUN mkdir /opt
244 3  COPY ./node-v0.12.0-linux-x64.tar.gz /opt/
4,5  RUN tar xzvf /opt/node-v0.12.0-linux-x64.tar.gz && ln -s /opt/node-v0.12.0-linux-x64/bin/node /usr/bin/node
8  RUN mkdir /var/www
9  ADD app.js /var/www/app.js
10  EXPOSE 8080
6  RUN rm /opt/node-v0.12.0-linux-x64.tar.gz
11  EXPOSE 80
12  CMD ["/usr/bin/node", "/var/www/app.js"]

SELF-ADAPTIVE BUILDING CONTAINER IMAGES

BACKGROUND

The present invention relates, generally, to the field of computing, and more particularly to operating system level virtualization.

An operating system level virtualization is a feature of a modern operating system that facilitates multiple isolated user space instances that are typically called images or containers. A user space is typically a computer code that runs outside the kernel of the operating system and may appear to be a real computer from the point of view of programs running the container.

Containers are useful for securely allocating finite hardware resources among a large number of users. Typically, system administrators use containers for consolidating server hardware by moving services on separate hosts into containers on a single server. In addition, containers are used for separating several programs to separate containers for improved security, hardware independence, and added resource management features. Containers also allow live migration of the running programs or services for dynamic load balancing by relocating containers between nodes in a cluster of servers.

SUMMARY

According to one embodiment, a method, computer system, and computer program product for building a self-adaptive building container images is provided. The present invention may include a computing device that receives one or more template files and one or more parameters associated with the one or more template files, where the one or more template files comprise one or more scripts, and where the associated one or more parameters comprise a user preference associated with an efficiency of the image. The computing device may determine dependencies between layers of the one or more scripts based on a unified image model. The unified image model may generate a logic tree that includes one or more nodes, where each one of the one or more nodes represents each one of the layers of the one or more scripts. The computing device may generate an efficient logic tree based on the logic tree and the user preference of a generated image model. The generated image model may generates the efficient logic tree by changing the dependencies of the one or more nodes in the logic tree based on the user preference. Based on the generated efficient logic tree the computing device may build the image.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to operating system level virtualization. The following described exemplary embodiments provide a system, method, and program product to, among other things, generate an efficient container image building process based on exploring the inherent relationships among instructions, and image deployment parameters. Therefore, the present embodiment has the capacity to improve the technical field of operating system level virtualization by increasing computer processing speed and space management during container execution by generating the container image based on instructions dependency analysis and efficient image generation based on parameters determined by a user.

As previously described, a container or an image is an operating system level virtualization that is a typical feature of a modern operating system that facilitates multiple isolated user space instances.

Typically, an image is built by a computing device using consecutive execution of instructions saved in one or more template files. The consecutive execution of the instructions may create an increased size of the image, increase image compilation time before and affect image execution speed. As such, it may be advantageous to, among other things, implement a system that analyzes the instructions in a template file of the image, creates a dependency tree after determining dependencies between the instructions, and based on parameters builds an efficient image. For example, if a user requests a fast execution of an image, the method will rearrange the instructions (layers) in order to achieve faster execution of the image.

According to one embodiment, a self-adaptive building program may receive template files and parameters. Then, the self-adaptive building program may parse one or more scripts from the template files, and a user preference associated with an efficiency of the image from the parameters. By analyzing the scripts, the self-adaptive building program may determine dependencies between layers using a unified image model and generate a logic tree that may be transferred into an efficient logic tree by generating an instructions model that may change the dependencies of the nodes in the logic tree and build a more efficient image.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine dependencies between the layers of the image scripts, and after converting the layers to nodes in the logic tree, rearranging the tree in order to achieve a more efficient image build corresponding to user preferences.

Figure 1:
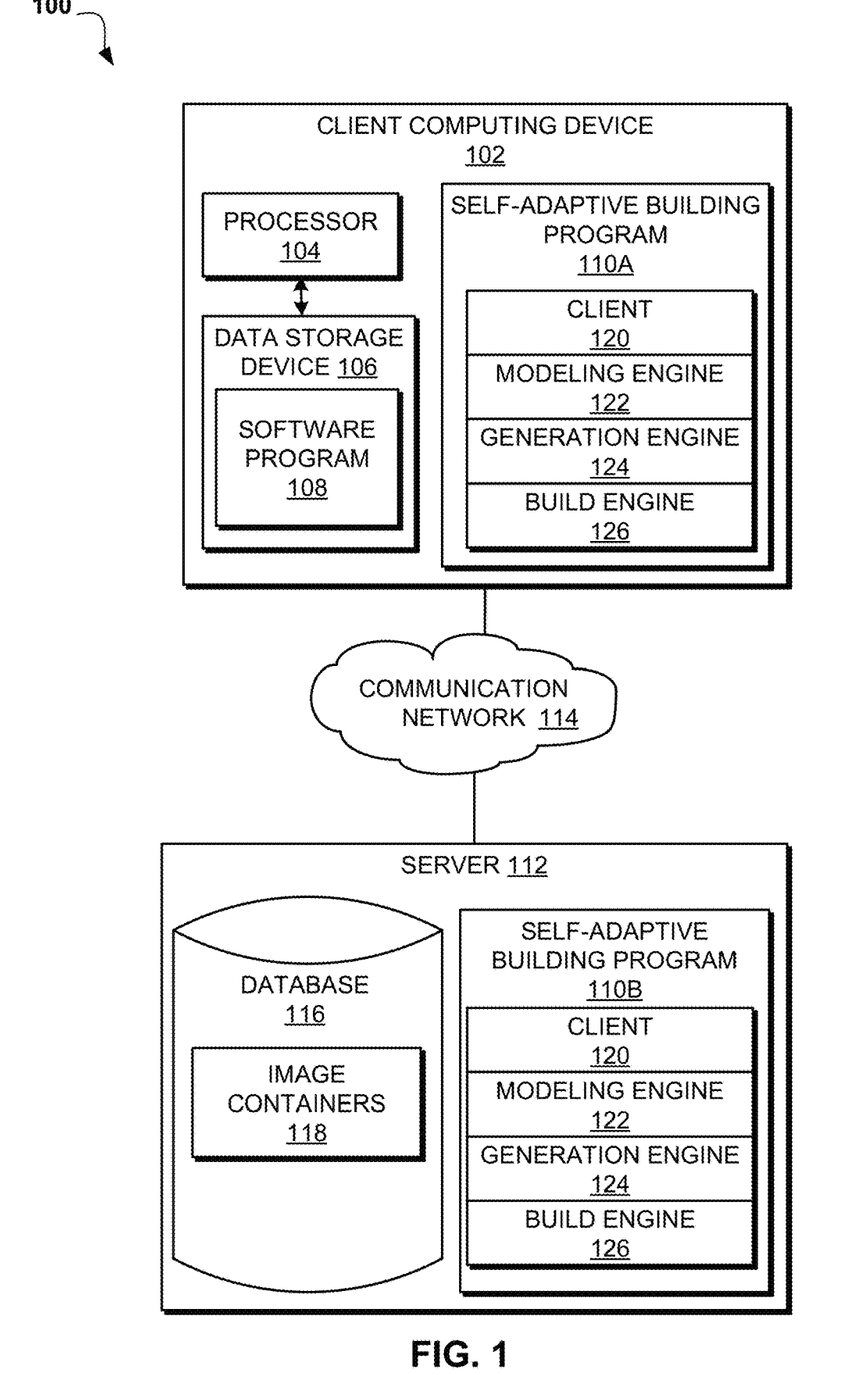
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a self-adaptive building program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a self-adaptive building program 110B and a database 116 and communicating with the client computing device 102 via the communication network 114, in accordance with embodiments of the invention. As will be discussed with reference to FIG. 4 the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The database 116 may store image containers 118. According to at least one embodiment, image containers 118 may include template files and parameters that are explained in further detail below with respect to FIG. 2A. As previously mentioned, image containers 118 may be multiple isolated user space instances that include a computer code that runs outside the kernel of the operating system and may appear to be a real computer from the point of view of programs running the image container 118.

According to the present embodiment, the self-adaptive building program 110A, 110B may include a client 120, modeling engine 122, generation engine 124, and build engine 126 components. The self-adaptive building program 110A, 110B may be a program capable of receiving one or more template files and parameters by client 120, determine dependencies between the instructions of the templates by modeling engine 122, generate a dependency tree by generation engine 124 and build an image based on the dependencies and parameters by build engine 126. The main software blocks of a self-adaptive building program are explained in further detail below with respect to FIG. 2A.

Figure 2A:
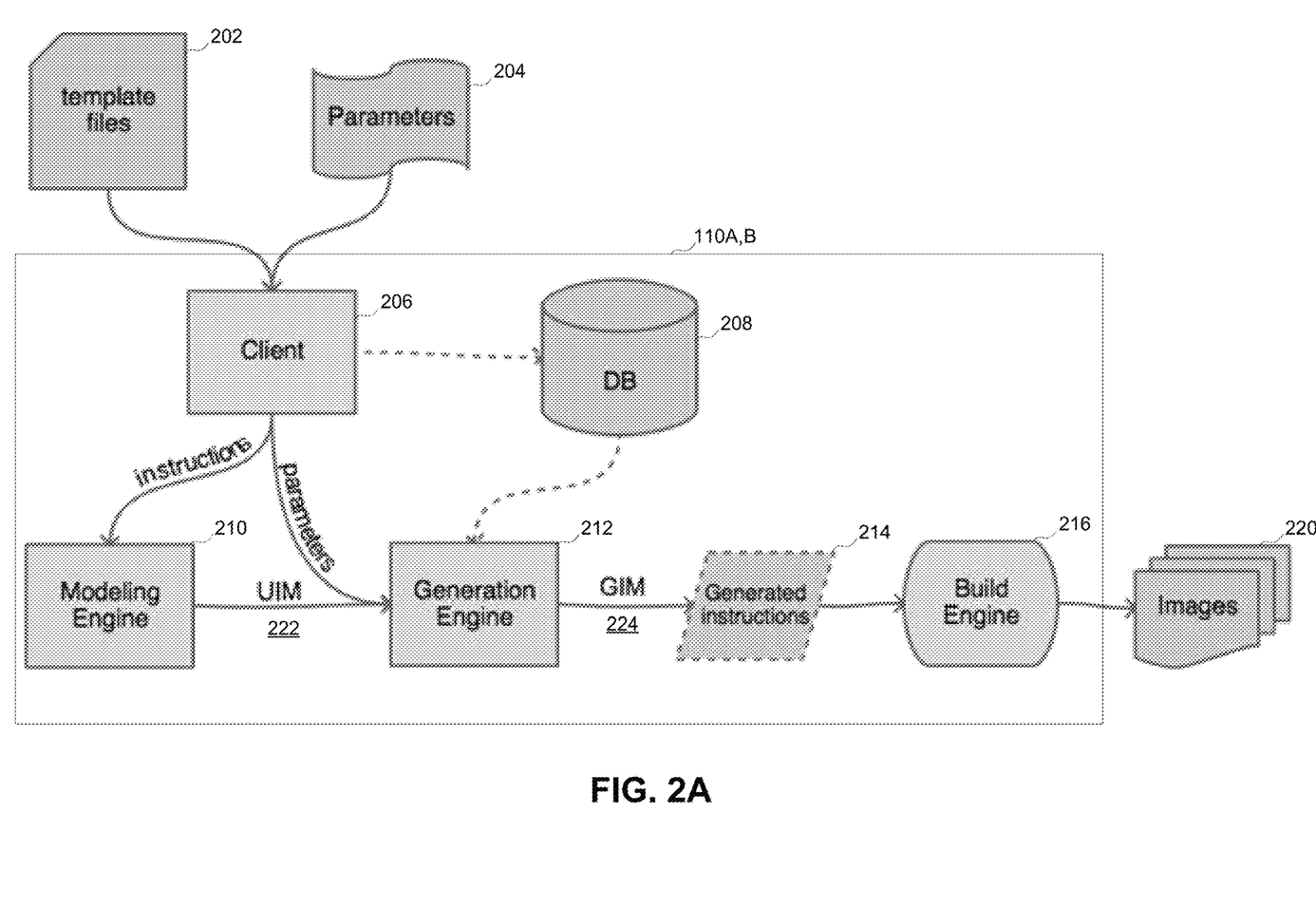
FIG. 2A depicts a block diagram representing main software blocks of a self-adaptive building program according to at least one embodiment.

Referring now to FIG. 2A, a block diagram of main software blocks of a self-adaptive building program is depicted, according to at least one embodiment. The self-adaptive building program 110A, 110B may include a client block 206 that receives template files 202 and parameters 204, a modeling engine block 210 that analyzes instructions received from client block 206 using UIM 222 (explained in further detail below with respect to FIG. 3), a generation engine block 212 that receives UIM 222 data from modeling engine block 210 and parameters from client block 206, and generates instructions using a GIM 224 where the generated instructions 214 are used by build engine block 216 to build one or more container images, such as images 220. According to at least one embodiment, template files 202, parameters 204, images 220 and all other byproducts of the method may be stored in one or more databases such as DB 208.

A unified image model, such as UIM 222, may construct a logic tree where the model assigns each layer (instruction) of the script to a separate node in the logic tree. Any layer that depends on a previous layer is assigned as a descendant to a parent node in the logic graph, while there is no order among children nodes. The logic graph may be constructed using incremental techniques, such as linear reduction and width aggregation approaches. The dependencies between the nodes may be assigned numerically and determined based on annotations created by a user to each layer of the template, or may be determined by a keyword based algorithm that determines the same keywords in more than one layer, or by semantic based algorithms. In another embodiment, a combination of the aforementioned approaches may be applied to determine dependencies between the layers.

A generated image model, such as GIM 224, may be used by generation engine 212 to rearrange the logic tree and create an efficient logic tree based on user defined parameters. According to at least one embodiment, GIM 224 may extract user specified parameters from parameters 204 that may relate to the desired efficiency of the image, such as that the image would be storage efficient, speed efficient or adaptive efficient. According to user efficiency preferences, GIM 224 may rearrange the logic tree nodes by changing the priority of the child nodes. For example, a user specified parameter may be a variable (number) that represents the user preferred efficient algorithm that may be applied to rearrange the script converted to a logic (dependency) tree, such as "1" may represent an adaptive efficient algorithm, "2" may represent a storage efficient algorithm and "3" may represent a speed efficient algorithm, respectively.

Figure 2B:
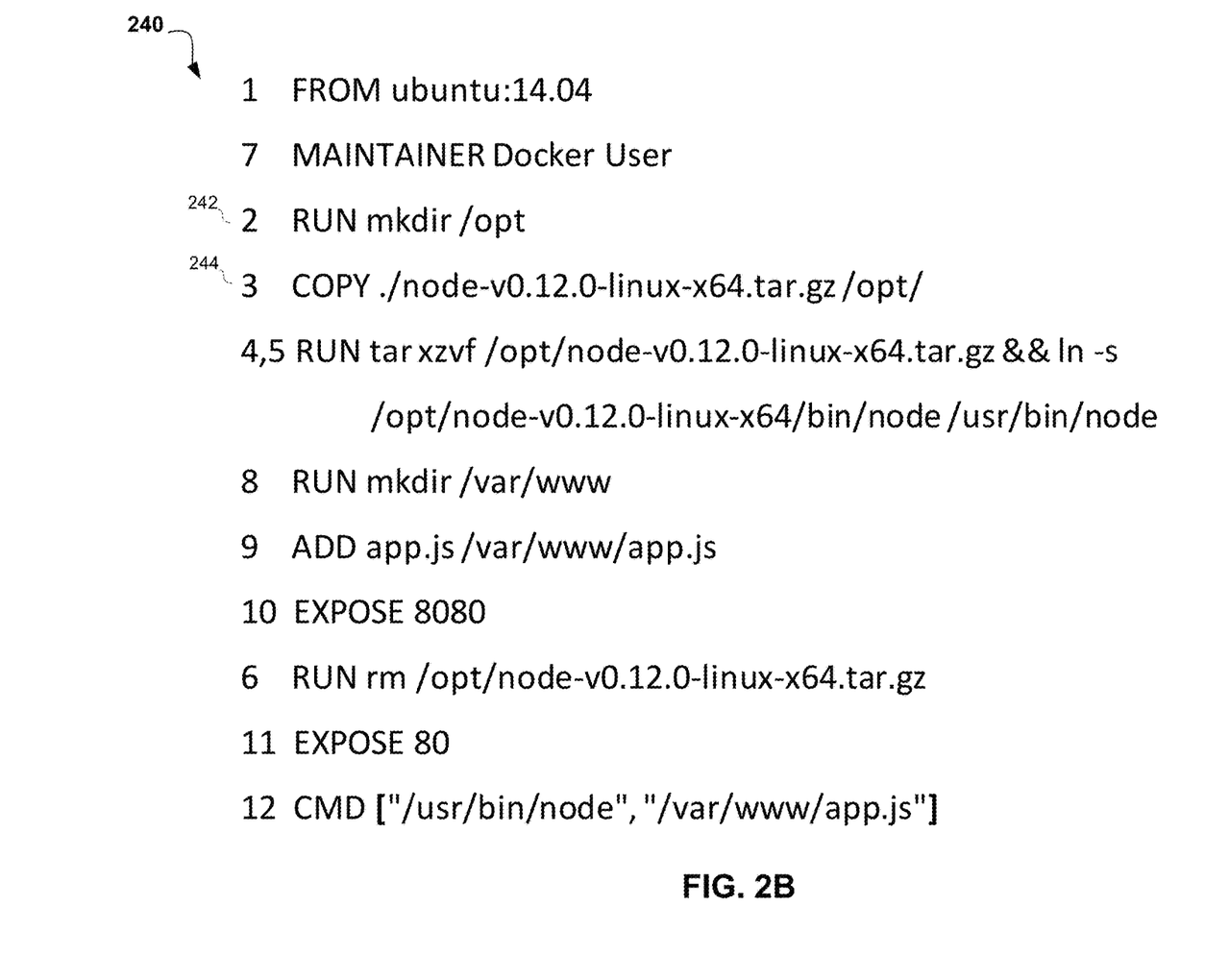
FIG. 2B depicts a script sample depicting a numerical dependency between the instructions according to at least one embodiment.

Referring now to FIG. 2B, a sample script 240 after dependency detection according to at least one embodiment is depicted. The self-adaptive building program 110A, 110B may determine dependencies between the layers of the sample script 240 either manually or automatically, and attach a numerical dependency to each layer. Manual detection may be performed by determining the numerical dependency from a user annotation to each layer of the script while automatic detection may be determined using keywords or semantic based method. For example, using semantic analysis, self-adaptive building program 110A, 110B may determine that lines 3 and 4 of the sample script 240 include a keyword "/opt", implying that line 4 may be executed only after line 3, and therefore attaching a numerical dependency 244 a higher numerical number (3) than the previous layer (2) represented by numerical dependency 242.

Figure 2C:
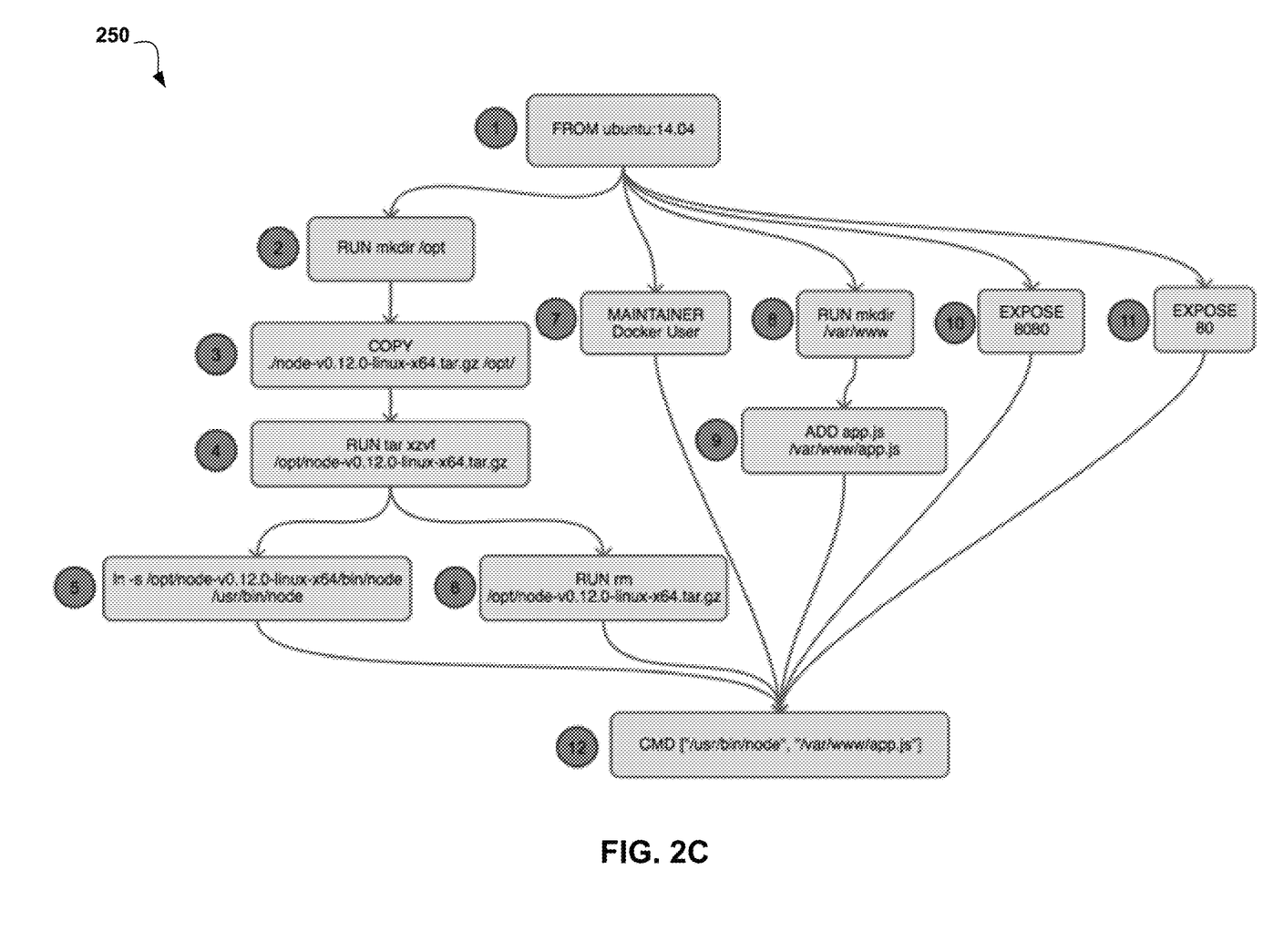
FIG. 2C depicts a logic tree based on numerical dependencies of each instruction according to at least one embodiment.

Referring now to FIG. 2C, a block diagram of logic tree 250 created by a UIM model based on dependencies according to at least one embodiment is depicted. As previously mentioned, after determining dependencies between the layers of the script, a modeling engine 210 of the self-adaptive building program 110A, 110B may create a dependency logic tree where each child node represents a layer of the script that depends on a parent node. For example, node 4 is a child node of node 3 because they share a common keyword "node-v0.12.0-linux-x64.tar.gz".

Figure 2D:
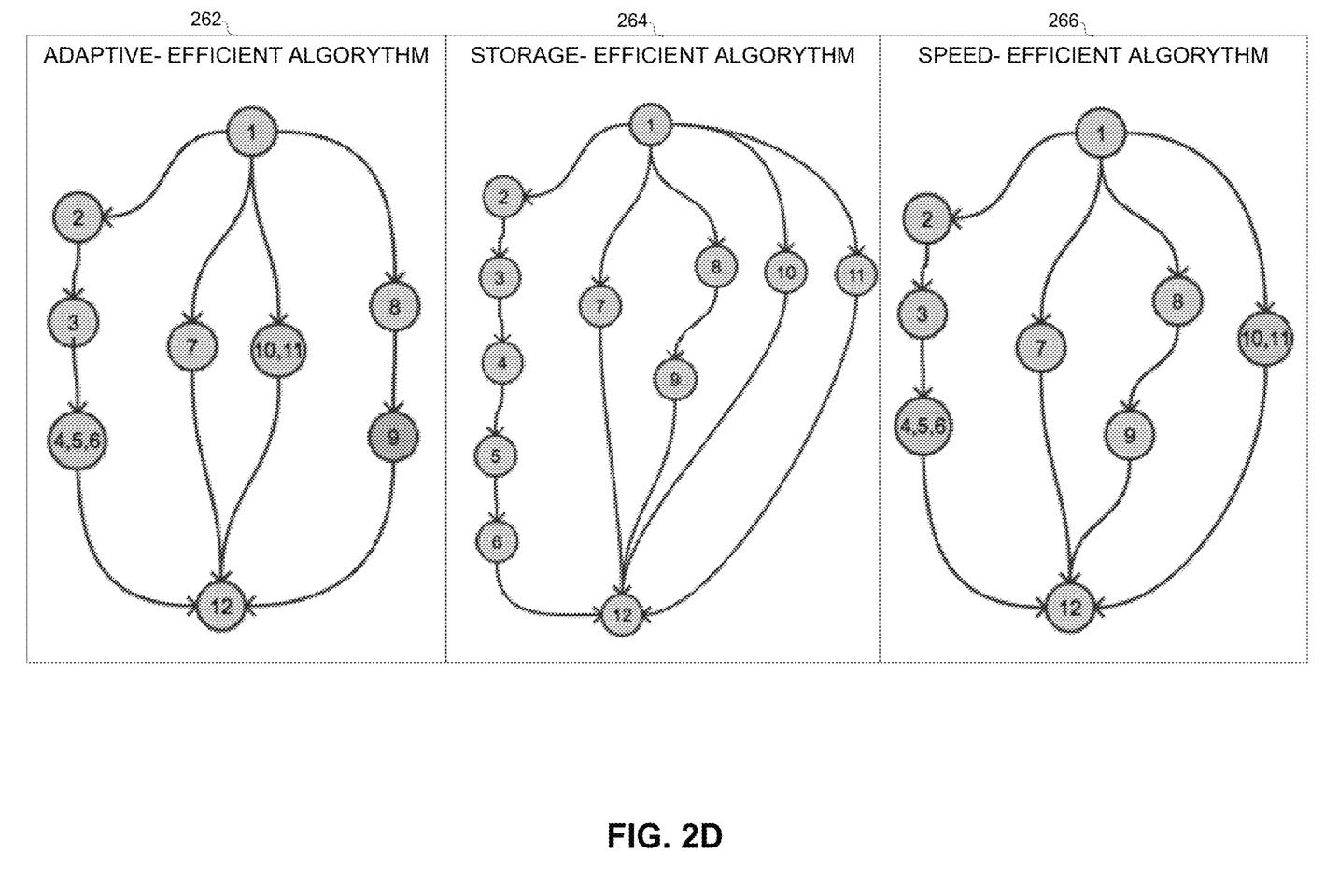
FIG. 2D depicts efficient logic trees based on parameters according to at least one embodiment.

Referring now to FIG. 2D, efficient logic tree rearranging algorithms 262-266 based on parameters according to at least one embodiment are depicted. As previously described, the template depicted in FIG. 2B may be rearranged based on parameters into an efficient logic tree in order to achieve better performance. According to at least one embodiment, the self-adaptive building program 110A, 110B may rearrange the logic tree to achieve adaptive efficient logic tree using adaptive efficient algorithm 262, a storage efficient logic tree using storage efficient algorithm 264, or speed efficient logic tree using speed efficient algorithm 264. The efficient logic tree rearranging algorithms 262-266 may be either known logic tree based algorithms or determined based on previous rearrangements made by the self-adaptive building program 110A, 110B and stored in DB 208. For example, in order to achieve faster performance speed, a speed efficient algorithm 266 may be applied where children nodes are executed concurrently, such as nodes 4, 5, and 6.

Figure 3:
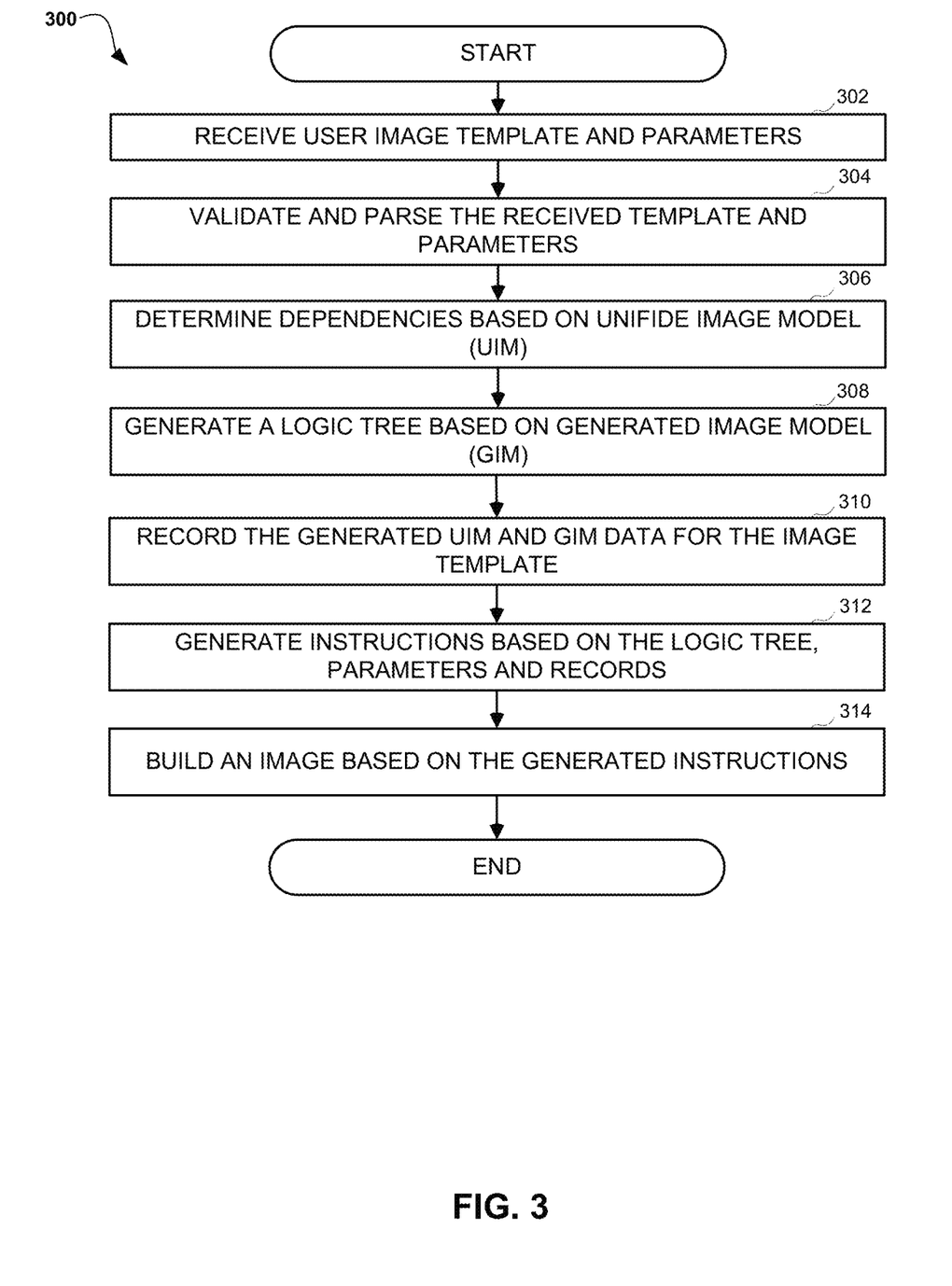
FIG. 3 is an operational flowchart illustrating a self-adaptive building process according to at least one embodiment.

Referring now to FIG. 3, an operational flowchart illustrating a process 300 is depicted according to at least one embodiment. At 302, the self-adaptive building program 110A, 110B receives user image template and parameters. According to at least one embodiment, an image template may include one or more building scripts, such as the script depicted in FIG. 2C, and user parameters may include requirements, such as one from a container building algorithm depicted in FIG. 2D.

Next, at 304, the self-adaptive building program 110A, 110B parses the received template and parameters. According to at least one embodiment, the self-adaptive building program 110A, 110B may parse the template and the parameters and validate that the template includes all the links and scripts for building the container and that the parameters include a user preference related to the efficiency of the image. For example, self-adaptive building program 110A, 110B may parse template files 202 to extract script 240 and determines user preferred image efficiency from parameters 204 that include preferences as to image efficiency, such as adaptive efficient algorithm 262.

Next, at 306, the self-adaptive building program 110A, 110B determines dependencies based on unified image model (UIM). According to at least one embodiment, the self-adaptive building program 110A, 110B may determine dependencies between instructions in the script either by analyzing annotations to each layer of the script or by either using semantic-based determination, such as keyword similarities between the layers, as depicted in FIG. 2B. In another embodiment, dependency determination may be performed by an independent software block, such as modeling engine 310.

Next, at 308, the self-adaptive building program 110A, 110B generates a logic tree based on generated image model. According to at least one embodiment, the self-adaptive building program 110A, 110B may access the UIM and rearrange the nodes of the generated UIM logic tree based on the preferences. For example, if the user specified in parameters 204 that the image must be speed efficient, self-adaptive building program 110A, 110B may rearrange the nodes of the logic tree using speed efficient algorithm 266.

Next, at 310, the self-adaptive building program 110A, 110B records the generated UIM and GIM data for the image template. According to at least one embodiment, the self-adaptive building program 110A, 110B may record the generated UIM and GIM information for each image template. The recorded information may be stored in a database, such as DB 208, and used by Generation Engine 212 for optimization processing. For example, the recorded UIM may be used by the self-adaptive building program 110A, 110B in order to create the images using specific GIM instructions, such as an image, for developers or to build a release image.

Next, at 312, the self-adaptive building program 110A, 110B generates instructions based on the logic tree, parameters and records. According to at least one embodiment, the self-adaptive building program 110A, 110B may generate instructions and rearrange the sequence of instructions execution in order to create an image that is based on user preferences. For example, if a user specified in the parameters that a storage efficient image is required, self-adaptive building program 110A, 110B may either generate a dependency tree based on applying a storage efficient algorithm, as described in FIG. 2D, or if the dependency tree was previously generated load the dependency tree from records that are stored in DB 208, as described in FIG. 2A.

Next, at 314, the self-adaptive building program 110A, 110B builds an image based on the generated instructions. According to at least one embodiment, the self-adaptive building program 110A, 110B may use generated instructions 214, as described in FIG. 2A, and execute the script in order to create one or more images, such as images 220. For example, after generation of GIM logic tree the self-adaptive building program 110A, 110B may convert the logic tree into a script and compile it into an image using a standard compiler.

It may be appreciated that FIG. 3 provides only an illustration of one implementation and does not imply any limitations with regard to how different embodiments may be implemented. Many modifications to the depicted environments may be made based on design and implementation requirements.

Figure 4:
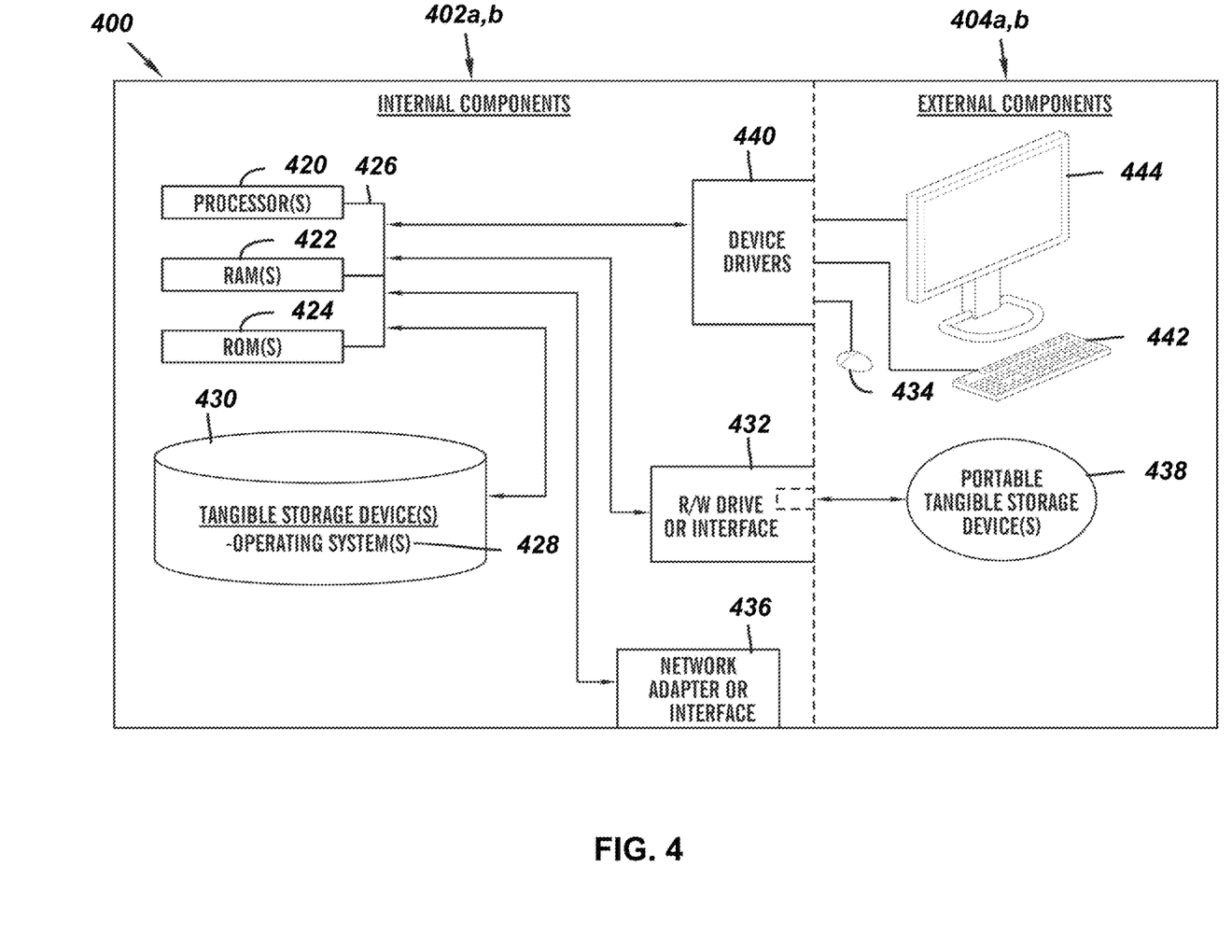
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402a,b and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the self-adaptive building program 110A in the client computing device 102, and the self-adaptive building program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the self-adaptive building program 110A, 110B, can be stored on one or more of the respective portable computer-readable tangible storage devices 438, read via the respective R/W drive or interface 432, and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 and the self-adaptive building program 110A in the client computing device 102 and the self-adaptive building program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the self-adaptive building program 110A in the client computing device 102 and the self-adaptive building program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
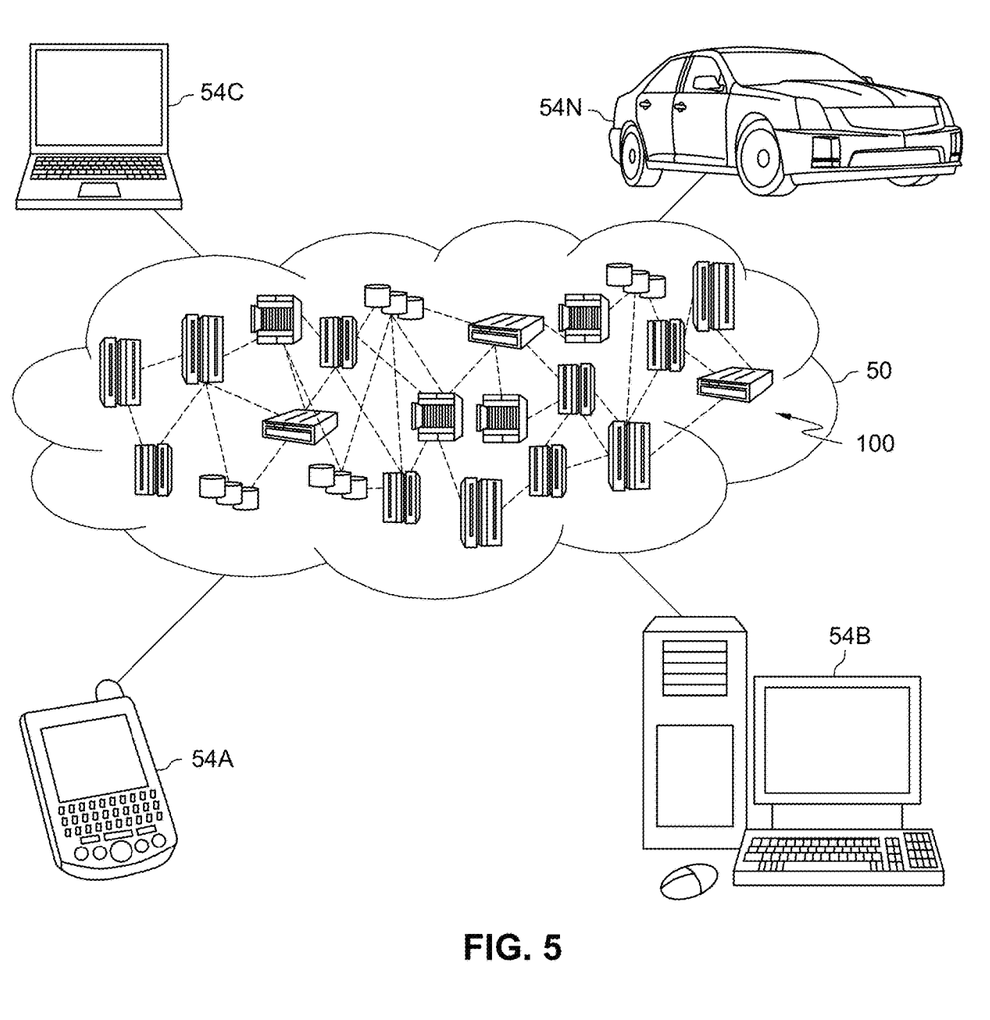
FIG. 5 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
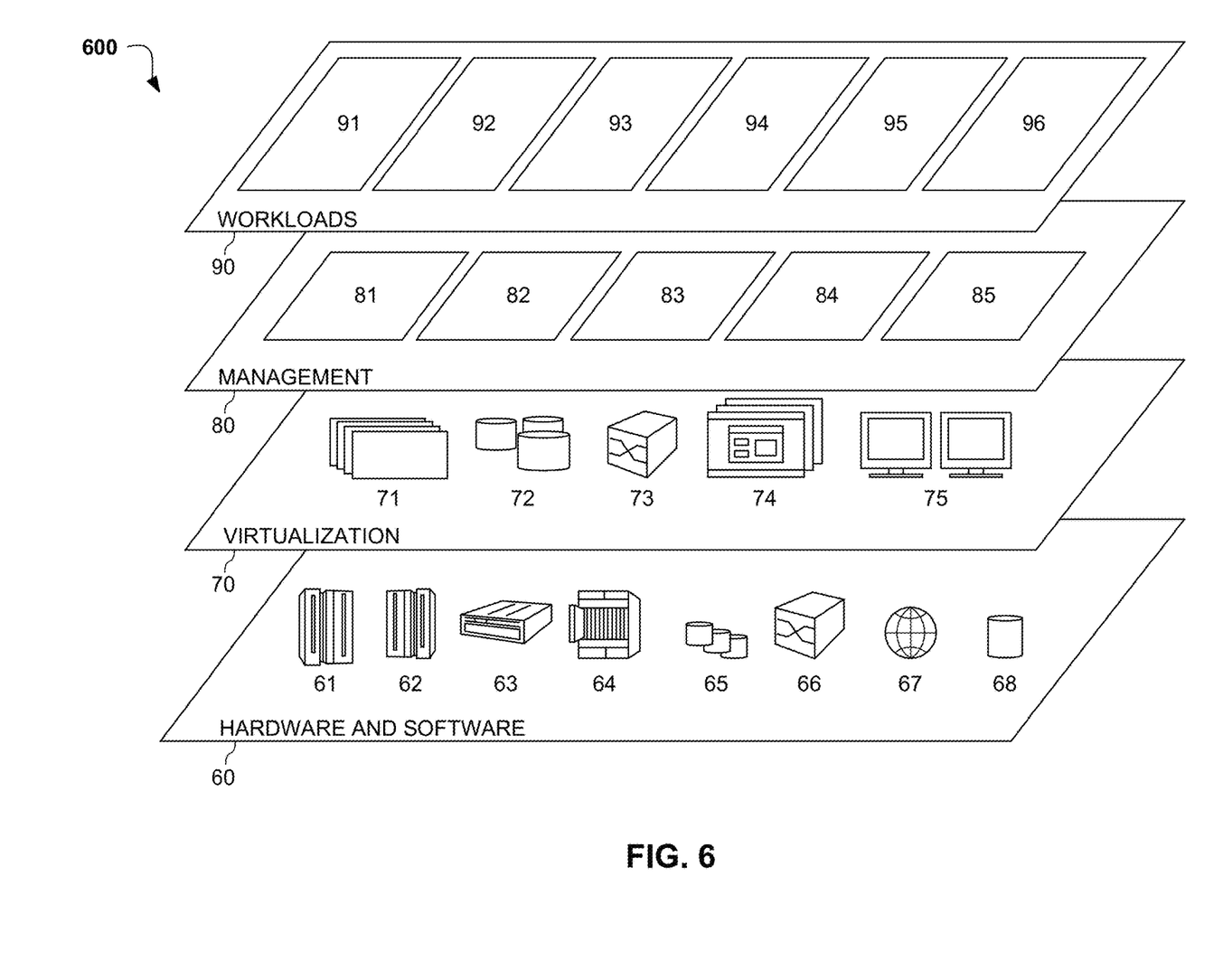
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-adaptive building processing 96. Self-adaptive building processing 96 may relate to receiving template files and user preferred parameters, parsing the script using UIM model and generating instructions based on GIM model to build an image container.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for self-adaptive building of an image, the method comprising:
    receiving one or more template files and one or more parameters associated with the one or more template files, wherein the one or more template files comprise one or more scripts, and wherein the associated one or more parameters comprise a user preference associated with an efficiency of the image;

determining dependencies between layers of the one or more scripts using semantic based method that attaches a numerical dependency to each layer of the layers based on a unified image model, wherein the unified image model generates a logic tree that comprises one or more nodes, wherein each one of the one or more nodes represents each one of the layers of the one or more scripts, and wherein a higher numerical value of the numerical dependency represents that the layer having the higher numerical value is executed after another layer from the layers having a lower numerical value of the numerical dependency;

generating an efficient logic tree based on the logic tree and the user preference of a generated image model, wherein the generated image model generates the efficient logic tree by changing the dependencies of the one or more nodes in the logic tree based on the user preference; and building the image based on the generated efficient logic tree, wherein building the image based on the generated efficient logic tree comprises converting the efficient logic tree to a script and executing the script to generate and store the image.

2. The method of claim 1, wherein determining dependencies between layers of the one or more scripts is based on an annotation made by a user to each one of the layers.

3. The method of claim 1, wherein determining dependencies between layers of the one or more scripts is based on a semantic analysis of each one of the layers.

4. The method of claim 1, wherein the efficiency of the image is selected from a group consisting of a storage efficient algorithm, a speed efficient algorithm, and an adaptive efficient algorithm.

5. The method of claim 1, further comprising:
recording the image; and
recording the logic tree and the efficient logic tree associated with the image.

6. The method of claim 5, wherein generating the efficient logic tree further comprises:
loading the efficient logic tree from a database based on determining that the efficient logic tree associated with the one or more template files was previously recorded.

7. The method of claim 5, wherein determining dependencies between layers of the one or more scripts further comprises:
loading the logic tree based on determining that the logic tree associated with the one or more template files was previously recorded.

8. A computer system for self-adaptive building of an image, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system, when executing the instructions by the at least one of the one or more processors, performs a method comprising:
receiving one or more template files and one or more parameters associated with the one or more template files, wherein the one or more template files comprise one or more scripts, and wherein the associated one or more parameters comprise a user preference associated with an efficiency of the image;
determining dependencies between layers of the one or more scripts using semantic based method that attaches a numerical dependency to each layer of the layers based on a unified image model, wherein the unified image model generates a logic tree that comprises one or more nodes, wherein each one of the one or more nodes represents each one of the layers of the one or more scripts, and wherein a higher numerical value of the numerical dependency represents that the layer having the higher numerical value is executed after another layer from the layers having a lower numerical value of the numerical dependency;

generating an efficient logic tree based on the logic tree and the user preference of a generated image model, wherein the generated image model generates the efficient logic tree by changing the dependencies of the one or more nodes in the logic tree based on the user preference; and building the image based on the generated efficient logic tree, wherein building the image based on the generated efficient logic tree comprises converting the efficient logic tree to a script and executing the script to generate and store the image.

9. The computer system of claim 8, wherein determining dependencies between layers of the one or more scripts is based on an annotation made by a user to each one of the layers.

10. The computer system of claim 8, wherein determining dependencies between layers of the one or more scripts is based on a semantic analysis of each one of the layers.

11. The computer system of claim 8, wherein the efficiency of the image is selected from a group consisting of a storage efficient algorithm, a speed efficient algorithm, and an adaptive efficient algorithm.

12. The computer system of claim 8, further comprising:
recording the image; and
recording the logic tree and the efficient logic tree associated with the image.

13. The computer system of claim 8, wherein generating the efficient logic tree further comprises:
loading the efficient logic tree from a database based on determining that the efficient logic tree associated with the one or more template files was previously recorded.

14. The computer system of claim 8, wherein determining dependencies between layers of the one or more scripts further comprises:
loading the logic tree based on determining that the logic tree associated with the one or more template files was previously recorded.

15. A non-transitory computer program product for self-adaptive building of an image, the non-transitory computer program product comprising:
one or more non-transitory computer-readable tangible storage medium and program instructions stored on at least one of the one or more non-transitory tangible storage medium, the program instructions executable by a processor, the program instructions comprising:
program instructions to receive one or more template files and one or more parameters associated with the one or more template files, wherein the one or more template files comprise one or more scripts, and wherein the associated one or more parameters comprise a user preference associated with an efficiency of the image;
program instructions to determine dependencies between layers of the one or more scripts using semantic based method that attaches a numerical dependency to each layer of the layers based on a unified image model, wherein the unified image model generates a logic tree that comprises one or more nodes, wherein each one of the one or more nodes represents each one of the layers of the one or more scripts, and wherein a higher numerical value of the numerical dependency represents that the layer having the higher numerical value is executed after another layer from the layers having a lower numerical value of the numerical dependency;

program instructions to generate an efficient logic tree based on the logic tree and the user preference of a generated image model, wherein the generated image model generates the efficient logic tree by program instructions to change the dependencies of the one or more nodes in the logic tree based on the user preference; and program instructions to build the image based on the generated efficient logic tree, wherein program instructions to build the image based on the generated efficient logic tree comprises program instructions to convert the efficient logic tree to a script and program instructions to execute the script to generate and store the image.

16. The non-transitory computer program product of claim 15, wherein program instructions to determine dependencies between layers of the one or more scripts is based on an annotation made by a user to each one of the layers.

17. The non-transitory computer program product of claim 15, wherein program instructions to determine dependencies between layers of the one or more scripts is based on a semantic analysis of each one of the layers.

18. The non-transitory computer program product of claim 15, wherein the efficiency of the image is selected from a group consisting of a storage efficient algorithm, a speed efficient algorithm, and an adaptive efficient algorithm.

* * * * *